(12) United States Patent
Kenagy et al.

(10) Patent No.: US 8,898,693 B2
(45) Date of Patent: Nov. 25, 2014

(54) SYSTEM AND METHOD OF PROVIDING INTERACTIVE ADVERTISEMENTS

(75) Inventors: Jason B. Kenagy, La Jolla, CA (US);
Per O. Nielsen, Chula Vista, CA (US);
Amy S. McGaraghan, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 12/615,999

(22) Filed: Nov. 10, 2009

(65) Prior Publication Data
US 2010/0122189 A1 May 13, 2010

Related U.S. Application Data

(60) Provisional application No. 61/113,433, filed on Nov. 11, 2008.

(51) Int. Cl.
*H04N 7/10* (2006.01)
*H04L 29/06* (2006.01)

(52) U.S. Cl.
CPC ............ *H04L 65/604* (2013.01); *H04L 65/607* (2013.01)
USPC ............................................. 725/32; 725/40

(58) Field of Classification Search
CPC .................. H04N 21/23424; H04N 21/26241; H04N 21/2668; H04N 21/4331
USPC ...................................................... 725/32–36
See application file for complete search history.

(56) References Cited

U.S. PATENT DOCUMENTS

| | | | |
|---|---|---|---|
| 6,240,555 B1 * | 5/2001 | Shoff et al. | 725/110 |
| 6,698,020 B1 | 2/2004 | Zigmond et al. | |
| 2002/0016965 A1 * | 2/2002 | Tomsen | 725/42 |
| 2002/0078446 A1 * | 6/2002 | Dakss et al. | 725/37 |
| 2002/0083446 A1 * | 6/2002 | Eaton et al. | 725/37 |
| 2002/0124252 A1 * | 9/2002 | Schaefer et al. | 725/33 |
| 2002/0184047 A1 * | 12/2002 | Plotnick et al. | 705/1 |
| 2006/0015893 A1 * | 1/2006 | Kitsukawa et al. | 725/23 |

(Continued)

FOREIGN PATENT DOCUMENTS

| | | |
|---|---|---|
| CN | 101179628 A | 5/2008 |
| CN | 101212447 A | 7/2008 |

(Continued)

OTHER PUBLICATIONS

Thawani A. et al: Context Aware Personalized Ad Insertion in an Interactive TV Environment Internet Citation [Online] Apr. 23, 2004, pp. 1-7, XP002421358, Retrieved from the Internet: URL:http://www.di.unito.it/liliana/ TV04/FINAL/thawani.pdf> [retrieved on Feb. 21, 2007] p. 4-p. 7.

(Continued)

*Primary Examiner* — Junior Mendoza
(74) *Attorney, Agent, or Firm* — The Marbury Law Group, PLLC

(57) ABSTRACT

Apparatus and methods for providing content by presenting multimedia content on a mobile device; receiving, on the mobile device, indicia of at least one insertion point in the multimedia content; receiving, on the mobile device, at least one identifier associated with the at least one insertion point, the identifier identifying one or more executable content; and presenting the executable content to a user of the mobile device proximate to the at least one insertion point.

46 Claims, 4 Drawing Sheets

(56) References Cited

U.S. PATENT DOCUMENTS

| | | | |
|---|---|---|---|
| 2008/0052750 A1* | 2/2008 | Grunnet-Jepsen et al. ... | 725/109 |
| 2008/0301743 A1 | 12/2008 | Vrielink et al. | |
| 2009/0070225 A1* | 3/2009 | Matz et al. ............... | 705/14 |
| 2010/0175080 A1* | 7/2010 | Yuen et al. ............... | 725/32 |
| 2013/0061262 A1* | 3/2013 | Briggs et al. ............... | 725/32 |

FOREIGN PATENT DOCUMENTS

| | | |
|---|---|---|
| KR | 20070032018 A | 3/2007 |
| KR | 20070101325 A | 10/2007 |
| KR | 20070120344 A | 12/2007 |
| KR | 20080015734 A | 2/2008 |
| KR | 20080015834 A | 2/2008 |
| WO | 2006121862 A2 | 11/2006 |
| WO | 2007082190 | 7/2007 |
| WO | WO 2007/082190 * 7/2007 ..................... 725/32 |  |

OTHER PUBLICATIONS

International Search Report, PCT/US2009/063965, International Searching Authority, European Patent Office, Feb. 17, 2010.
Written Opinion, PCT/US2009/063965, International Searching Authority, European Patent Office, Feb. 17, 2010.

* cited by examiner

SYSTEM AND METHOD OF PROVIDING INTERACTIVE ADVERTISEMENTS

CLAIM OF PRIORITY

This application claims the benefit of U.S. Provisional Application No. 61/113,433, filed Nov. 11, 2008, entitled "SYSTEM AND METHOD OF PROVIDING INTERACTIVE ADVERTISEMENTS", which is hereby incorporated by reference herein in its entirety.

BACKGROUND

Electronic devices such as mobile telephone handsets and other mobile devices may be configured to receive broadcasts of sports, entertainment, informational programs, or other multimedia content items. For example, audio and/or video data may be communicated using a broadband broadcast communications link to the electronic devices. There is a need to provide a person an enhanced viewing experience on such devices.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "DETAILED DESCRIPTION" one will understand how the features of this invention provide advantages that include an enhanced user interface providing customized multimedia access including providing a way to provide users more information related to broadcast content.

One embodiment includes a method of providing content. The method includes presenting multimedia content on a mobile device. The method further includes receiving, on the mobile device, indicia of at least one insertion point in the multimedia content. The method further includes receiving, on the mobile device, at least one identifier associated with the at least one insertion point. The identifier is indicative of one or more executable content. The method further includes presenting the executable content to a user of the mobile device proximate to the at least one insertion point.

One embodiment includes a mobile device for providing content. The device comprises at least one receiver, an output device; and at least one processor in communication with the receiver and the output device. The processor is configured to present multimedia content using via the output device, receive, via the receiver, indicia of at least one insertion point in the multimedia content, and receive, via the receiver, at least one identifier associated with the at least one insertion point. The identifier is indicative of one or more executable content. The processor is further configured to present the executable content to a user via the output device proximate to the at least one insertion point.

One embodiment includes a computer-program product. The product includes a computer-readable medium having stored thereon codes executable by at least one processor to present multimedia content on a mobile device, receive, on the mobile device, indicia of at least one insertion point in the multimedia content, and receive, on the mobile device, at least one identifier associated with the at least one insertion point. The identifier is indicative of one or more executable content. The codes are further executable by the at least one processor to present the executable content to a user of the mobile device proximate to the at least one insertion point.

One embodiment includes a method of providing content. The method includes generating indicia of an insertion point instructing a rendering device configured to render multimedia content to insert executable content proximal the insertion point, generating an identifier indicative of one or more executable content, and communicating the indicia and identifier in connection with a broadcast of the multimedia content.

One embodiment includes a system for providing content. The system includes a network interface configured to communicate data with a rendering device, and a service configured to generate indicia of an insertion point instructing the rendering device configured to render multimedia content to insert executable content proximal the insertion point, generate an identifier indicative of one or more executable content, and communicate the indicia to the device in connection with a broadcast of the multimedia content.

One embodiment includes a system for providing content. The system includes means for generating indicia of an insertion point instructing the rendering device configured to render multimedia content to insert executable content proximal the insertion point, means for generating an identifier indicative of one or more executable content, and means for communicating the indicia to the device in connection with a broadcast of the multimedia content.

DETAILED DESCRIPTION

The following detailed description is directed to certain specific aspects of the invention. However, the invention can be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1:
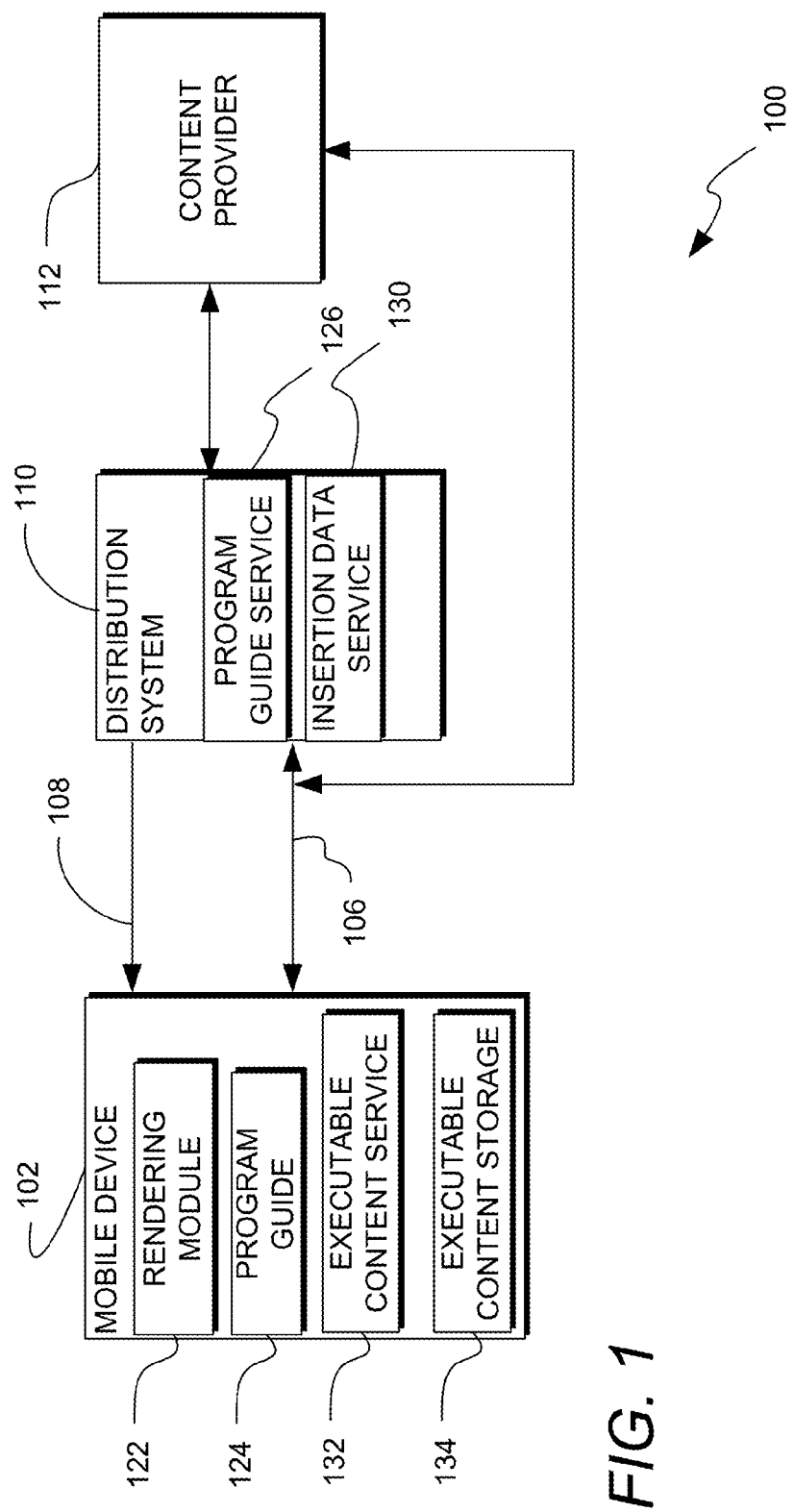
FIG. 1 is a block diagram of a system for providing broadcast programming.

FIG. 1 is a block diagram illustrating an example system 100 for broadcasting multimedia content to mobile devices 102 from one or more content providers 112 via a distribution system 110. One aspect of the invention is to supplement the presentation of the multimedia content with the presentation of executable content at or proximate to an insertion point in the multimedia content. The executable content may, for example, provide additional information related to the multimedia content or it may provide information unrelated to the multimedia content but related to a user of the mobile device. For example, the multimedia content may comprise an entertainment presentation which a user has elected to watch, such as a TV program, while the executable content comprises an advertisement which may be thematically related to the subject matter being presented by the multimedia content proximate to the insertion point. By way of another example, a user may be provided additional information about a product, being advertised proximate to the insertion point in the multimedia content, such as where to purchase the product locally. In another example, a sporting event may be augmented with additional executable content that presents scores from other games and/or statistical information. In yet another example, the multimedia content may comprise a movie while the executable content comprises audio overplayed on the video providing additional information, such as behind the scenes information about the movie. In another example, the executable content may be selected based on preferences of the user of a particular mobile device. The preferences be predictive in that they are determined based upon past actions of the user or they may be based on responses of the user to a series of questions, for example presented as a series of user adjustable parameters.

As used herein, the term "multimedia content" generally refers to an electronically delivered combination of media including text, audio, still images, and video. It is to be noted that multimedia content can also refer to singular media capable of being electronically presented to a user, such as is the case with music, video and animation. Multimedia content may, for example, comprise (but is not limited to) any of a variety of streaming file types including QUICKTIME, MPEG 2, MPEG 4, AVI, etc. . . . . The files may be streamed using a variety of methodologies, including broadcast, unicast and multicast.

As used herein the term "executable content" refers to content that is presented to a user in response to an identified occurrence. The content may be multimedia content or any type of media capable of being present to a user. In at least some aspects, the identified occurrence may be reaching a predefined insertion point in the presentation of the multimedia content. In other aspects, the identified occurrence may be the expiration of a timer or the identification of a particular time and/or date. In other aspects, the identified occurrence may be the receipt of a predetermined user input, that in turn may be prompted by message presented to the user. The display of such a message may be initiated based on, for example, reaching a predefined insertion point in the presentation of the multimedia content or some other identified occurrence. In one aspect, the executable content is stored on the device that presents the multimedia content to the user and may, for example, comprise (but is not limited to) Adobe Flash files, Java applications or applets, any of the aforementioned streaming file types, or other types of content including content for which rendering the content comprises executing associated scripts or macros.

Referring once again to FIG. 1, the distribution system 110 receives a stream of data having a multimedia content from the content provider 112 and provides the multimedia content to one or more mobile devices 102 via a first communication link 108. FIG. 1 illustrates an aspect in which the content provider 112 transmits content to the mobile device 102 through the distribution system 110. However, it is to be recognized that the content provider 112 may communicate the content directly to the mobile device 102 (not shown in FIG. 1), bypassing the distribution system 110, for example utilizing the first communications link 108. It is to be recognized that in other aspects multiple content providers 112 may provide multimedia content via multiple distribution systems 110 to the mobile devices 102.

In the example illustrated in FIG. 1, the first communication link 108 is a forward link only wireless broadcast. However, the aspects described herein are not limited to a forward link only wireless broadcast and may utilize a variety of transmission technologies and techniques, including ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, an orthogonal frequency division multiple access (OFDM) system, or a DVB-H system.

The distribution system 110 is also configured to communicate over a second communication link 106. In the example illustrated in FIG. 1, the second communication link 106 is a bi-directional wireless telecommunication link. In this aspect, the second communication link 106 is configured to communicate voice traffic and/or data traffic among and between various devices, include multiple mobile devices 102. The communication link 106 may also communicate transmission schedules and other data between the distribution system 110 and the mobile devices 102. The second communication link 106, as used by the aspects described herein is not limited to a bi-directional wireless telecommunication link, or even any particular telecommunication technology. In this regards, the second communication link 106 may comprise one or more wired and/or wireless links, including one or more of a ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, an orthogonal frequency division multiple access (OFDM) system, or a DVB-H system.

The distribution system 110 also includes a program guide service 126. The program guide service 126 receives programming schedule and content related data from the content provider 112 and/or other sources and communicates data defining an electronic programming guide (EPG) 124 to the mobile device 102. The EPG 124 may include data related to the broadcast schedule of multiple broadcasts of particular content items available to be received over the communication link 108. The EPG data may include titles of content items, start and end times of particular broadcasts, category classification of programs (e.g., sports, movies, comedy, etc.), quality ratings, adult content ratings, etc. The EPG 124 may be communicated to the mobile device 102 over either the first communication link 108 or second communication link 106 and stored on the mobile device 102.

Finally, the distribution system 110 includes an insertion data service 130 that generates indicia, comprising data or metadata, indicative of an insertion point for inserting executable content in a stream of multimedia content and possibly an identification of associated executable content. The insertion point may be expressed in a variety of manners, for example as an offset time within a content item, as an absolute time, using data indicative of a particular frame or portion of the content item, or any other data suitable for identifying an insertion point within a multimedia content item such as a geographical location or an identification of a data pattern to be found in, or calculated based on, the multimedia content (e.g. based on fingerprints calculated based on the audio or video track). The identification of associated executable content can be direct, e.g. a file name and location. For example, the identification may comprise a pointer, e.g., a Uniform Resource Locator (URL), to a location of the executable content to be inserted (representing a direct identification). The location may be on the mobile device 102, the distribution system 110, the content provider 112 or on an entirely separate server (not illustrated). Alternatively, the identification may be indirect, indicating preferences as to the type or genre of executable content to be selected. In the case of an indirect identification, another service supplies the direct identification. The service may reside on the mobile device 102, the distribution system 110, the content provider 112 or on an entirely separate server (not illustrated). An indirect identification may comprise a pointer, e.g. an URL, to a server hat dynamically provides executable content. In this aspect, one or more parameters, such as a category, may be included with the indicia to assist with the selection of executable content. The indicia may be transmitted to the mobile device 102 via the first or second communicant links 108 and 106, respectively.

The mobile device 102 is configured to receive a stream of multimedia content, one or more executable content (or identification thereof) and one or more indicia. The executable content, or the data providing the identification thereof, may be transmitted and stored on the mobile device 102 prior to receiving the stream of multimedia content. Proximate to the times and/or locations indicated by the indicia, the presentation of the multimedia content is interrupted and the identified executable content is be presented to the user. Alternatively, a prompt may be displayed to a user, at the time and/or location indicated by the indicia, seeking permission to display the executable content. Upon receipt of permission, the executable content is presented to the user. If the user does not provide such permission (or the request times out), the presentation of the stream of multimedia content is resumed. It is to be noted that the presentation of the stream of multimedia content need not be stopped when interrupted, rather the presentation may continue as a background process (possibly with the brightness and/or volume diminished) overplayed by the presentation of the prompt and/or executable content.

The executable content may be stored on the mobile device 102 in an executable content storage 134 and maintained by an executable content service 132. The executable content service 132 receives executable content, stores the executable content in the executable content storage 134, and provides access to the executable content for presentation proximate to insertion points identified by the insertion data service 130. The executable content service 132 may also be responsible for identifying insertion points in the multimedia content based on indicia received from the insertion data service 130. At, or prior to, an insertion point, the executable content service 132 determines whether an identified executable content is stored in the executable content storage 132 or is otherwise available. When the insertion point is reached and if the executable content is available, the executable content is presented to the user. Alternately, a prompt is presented to the user seeking permission to reproduce the executable content. In one aspect, the executable content service 132 includes logic for displaying the aforementioned prompt allowing a user to determine whether to execute the executable content proximal to the insertion point. Alternatively, the logic to display the prompt may be included in the executable content. It is also entirely permissible to simply present the executable content to the user without asking for his or her assent. In yet another aspect, metadata associated with the indicia may specify whether the user is to be asked for permission prior to presentation of the executable content.

In one aspect, the executable content service 132 is configured to select executable content based on information about a user of the device. In one such aspect, the insertion data service 130 includes, or communicates with, a user profile database (not illustrated) that identifies executable content based on any number of parameters, including information about a user of the mobile device 102. In one aspect, the executable content service 132 includes, or communicates with, a user profile database and at least partly determines executable content to execute based on user profile information. For example, the executable content may be selected based on preference, demographic or other data associated with a user of the mobile device. In one aspect, metadata in the indicia may identify several executable content items along with demographic parameters such as age ranges. The executable content service 132 may then select the executable content based on stored demographic data, such as age, of one or more users of the mobile device 102.

Table 1 illustrates an example of the metadata that may be included in the indicia.

TABLE 1

| Field | Example Value |
| --- | --- |
| Insertion Point | 10 seconds (offset) |
| Executable_Content_Item_1 | http://contentserver/url1 |
| Executable_Content_Item_1_param | user.age between 18-35 |
| Executable_Content_Item_2 | http://contentserver/url2 |
| Executable_Content_Item_2_param | user.age between 36-55 |
| Default_Executable_Content_Item | http://contentserver/url3 |
| Trigger_prompt_data | http://contentserver/url4 |

In the example data structure illustrated in table 1, an Insertion Point field specifies when or where executable content may be inserted. It is to be noted that each record may include a plurality of Insertion Points fields and that any multimedia content may have one or more records associated therewith. A variety of fields are illustrated that may be used by the executable content service 132 to select particular executable content for insertion. The metadata may include one or more URLs or other data identifying content along with where and how such content may be downloaded. In the example illustrated in Table 1, different demographic groups are defined in the Executable_Content_1 and Executable_Content_2 fields. Corresponding selection parameters or criteria are defined in the Executable_Content_Item_1_param and Executable_Content_Item_2_param fields. The selection parameters comprise queries with respect to a user data or a user database of the mobile device 102. Table 1 further illustrates the use of defined default executable content that can be selected if no other content is selected based on the selection parameters. The Trigger_prompt_data field may be used to define, or in this case point to the definition for, a prompt seeking the users permission to display the executable content (such as illustrated below in FIG. 3C). The definition may include an identity, configuration, or other content associated with the prompt. In addition, or alternatively to a URL, the metadata may specify a prompt directly within the metadata particular text, images, or other multimedia data.

As noted, the executable content service 132 may be configured to maintain the executable data in the executable content storage 134. For example, in one aspect, the distribution system 110 broadcasts such executable content, e.g., via the communication link 108, such as between other content items, in a subchannel, or via a particular stream that the executable content service 132 accesses and records. In one aspect, the insertion data service 130 provides additional metadata indicative of executable content or indicative of URLs where such content may be preloaded. The executable content may be stored in a common area until space is required for user content items, or in a reserved area where it is stored until space is required for other executable content or until expired. The executable content may expire (and be deleted from the executable content storage 134) based on expiration time data received with the executable content or via metadata received, for example, via the insertion data service 130. In one aspect, the executable content storage 134 may maintain the content until an expiration message is received, e.g., via the insertion data service 130. In one aspect, the contents of the executable content storage 134 are maintained based on information about a user of the mobile device, such as from a user profile database. In one such aspect, different versions of particular executable content may be received and stored based on user profile information. In one aspect, the contents of the database are managed based on user profile data. For example, storage space of the executable content storage 134 may be managed so that executable content determined based on user profile data may be preferentially stored in the executable content database 134.

The mobile device 102 also includes a rendering module 122 configured to render the multimedia content items received over the content item communication link 108. The rendering module 122 may include analog and/or digital technologies. The rendering module 122 may include one or more multimedia signal processing systems, such as video encoders/decoders, using encoding/decoding methods based on international standards such as MPEG-x and H.26x standards. Such encoding/decoding methods generally are directed towards compressing the multimedia data for transmission and/or storage.

Figure 2:
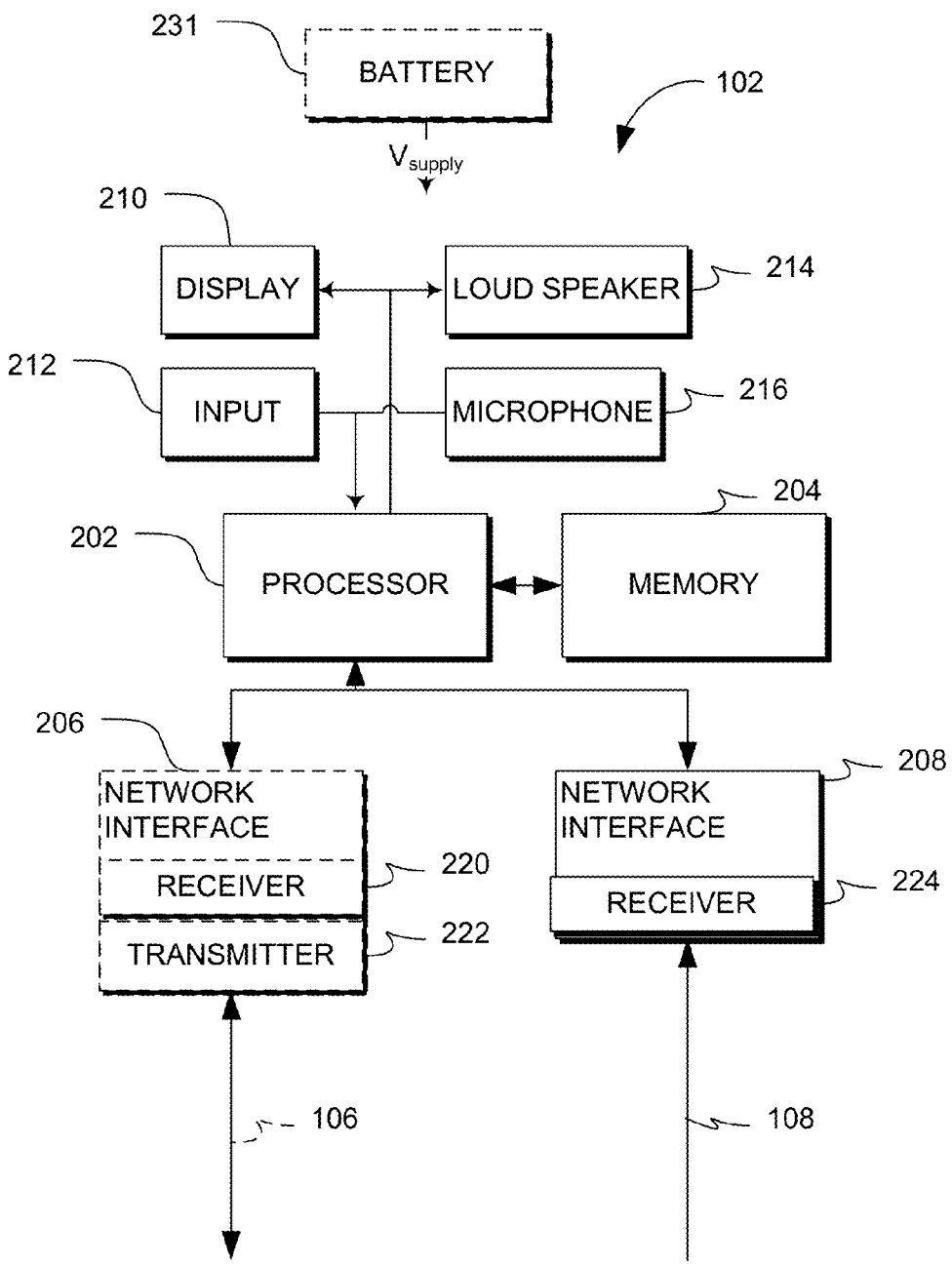
FIG. 2 is a block diagram of a mobile device illustrated in FIG. 1.

FIG. 2 is a block diagram illustrating of a mobile device 102 illustrated in FIG. 1. The device 102 includes a processor 202 that is in communication with a memory 204 and a network interface 208 that communicates over the communication link 108. In the examples illustrated in FIG. 1 and FIG. 2, the communication link 108 is a forward link only communication link. However it is to be recognized that the network interface 208 and receiver 224 may be provisioned to receive signals according to any number of technologies, be they wired or wireless. Examples of wired technologies including Ethernet, telephone (e.g., POTS), cable, power-line, and fiber optic systems. Examples of suitable wireless technologies include a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, an orthogonal frequency division multiple access (OFDM) system, or a DVB-H system.

The mobile device 102 may include a second network interface 206 for communicating via the second communication link 106, which as was the case in FIG. 1 is illustrated as being bi-directional. The network interface 206 may include any suitable antenna (not shown), a receiver 220, and a transmitter 222 so that the exemplary device 102 can communicate with one or more devices over the second communication link 106. Optionally, the network interface 206 may also have processing capabilities which reduce processing requirements of the processor 202.

The mobile device 102 also includes a display 210; a user input device 212 including one or more suitable input device such as a key pad, touch screen, accelerometer or other suitable input device; a loudspeaker 214; and a microphone 216. The mobile device 102 may optionally include a battery 231 to provide power to one or more components of the device 102. The mobile device 102 may comprise at least one of a mobile handset, a personal digital assistant, a laptop computer, a headset, a vehicle hands free device, or any other electronic device. For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, or any other suitable device.

The mobile device 102 may be implemented in a variety of ways. Referring to FIG. 2, the mobile device 102 is represented as a series of interrelated functional blocks representing functions implemented by, for example the processor 202, software, some combination thereof, or in some other manner as taught herein. For example, the processor 202 may facilitate user input via the input devices 212. Further, the transmitter 222 may comprise a processor for transmitting that provides various functionalities relating to transmitting information to another device 102. The receiver 220 may further comprise a processor that provides various functionality relating to receiving information from another device 102.

The mobile device 102 may be configured to receive data concurrently from one or both of the communication links 108 and 106. For example, the processor 202 may be incapable of performing the receiving and/or transmitting functions of the network interface 206 at the same time that the network interface 208 is receiving multimedia content (or executable content) over the communication link 108. Thus, for example, in one aspect, reception or display of a broadcast program may be discontinued over the communication link 108 when a signal, e.g., a telephone call for example, is received over the communication link 106.

The mobile device 102 may be implemented using any suitable combination of the functions and components discussed with reference to FIG. 2. For example, the mobile device 102 may comprise one or more integrated circuits, and, in-turn, the integrated circuits may comprise one or more processors that provide the functionality of the processor 202 illustrated in FIG. 2. The integrated circuit may also comprise other types of components that implement some or all of the functionality of the illustrated processor components. Further, one or more processors may implement the functionality of the illustrated processor components.

FIGS. 3A-3D are drawings of a user interface for the device of FIG. 2. In particular, FIGS. 3A-3D illustrate a progression of screen shots thereby providing an example user interface 300 for display on the display 210 of the mobile device 102. In this discussion, the multimedia content is described as comprising a plurality of content items, e.g. first and second content item. In the illustrated example, the insertion point is proximal to a second content item.

Figure 3A:
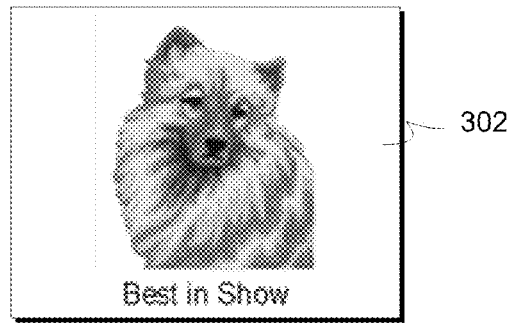
FIGS. 3A-3D are drawings of a user interface for the device of FIG. 2.
Figure 3B:
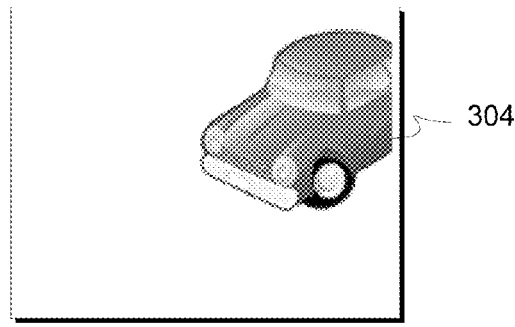
Figure 3C:
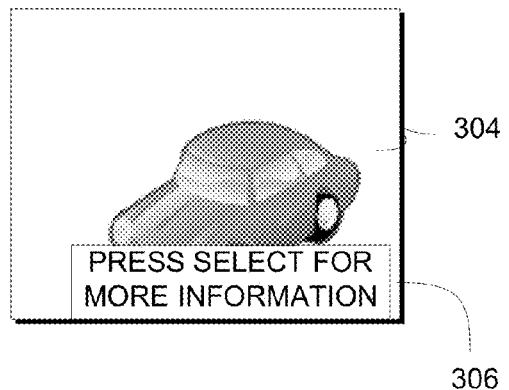

Referring to FIG. 3A, a first content item 302, a dog show, is being presented to a user. Referring the next figure in sequence, FIG. 3B, a second content item 304, an advertisement, is present to the user. During the display of the second content item, a determination is made that an insertion point has been reached (or is approaching). At this time a further determination is made as to whether the desired executable content is available in the executable content storage 134. If the desired executable content is available, a prompt 306 is displayed, as illustrated in FIG. 3C, asking a user of the mobile device 102 whether he or she wishes to view the identified executable content. The size, location, and other display attributes of the user interface control 306 may be predetermined or may be specified by metadata associated with the indicia. In one aspect, parameters for displaying the prompt 306 may be identified by the metadata associated with the insertion point. For example, such metadata may specify the period of time that the prompt 306 is to be displayed. In one aspect, the specified time period is based on the time period during which the second content item 304 is received and displayed.

Figure 3D:
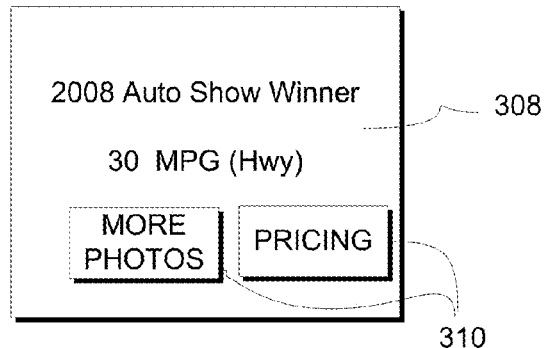

Referring to FIG. 3D, an affirmative answer to the prompt 306 causes the presentation of executable content 308. As illustrated in FIG. 3D, the executable content 308 may be interactive content comprising user interface controls 310. In the illustrated example, the executable content 308 provides additional information related to the second content item 304 (associated with an automobile) and offers to provide additional information using the user interface controls 310. Hence, according to one aspect, a user is presented with an option to display executable content that provides additional information, such as advertisements or additional program content.

Figure 4:
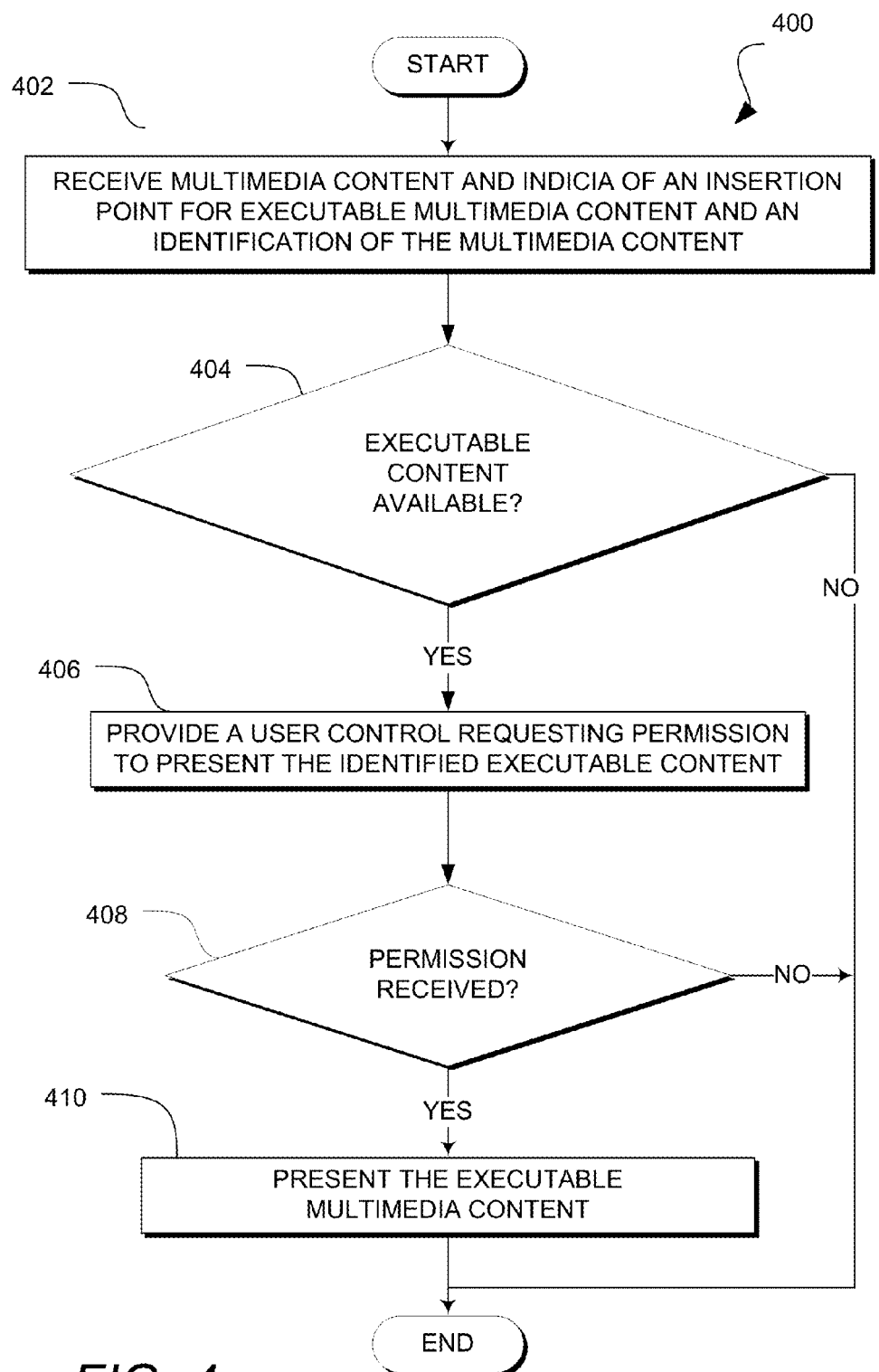
FIG. 4 is a flowchart of a method of interactive content in association with a broadcast in a system such as illustrated in FIG. 1.

FIG. 4 is a flowchart illustrating an example of a method 400 of presenting executable content in association with multimedia content in systems such as the example system 100. The method 400 begins at a block 402 in which the processor 202 of the mobile device 102 receives multimedia content, at least one indicia defining an insertion point and an identifier (possibly included with the indicia) for the executable content. The indicia and identifier may be transmitted with the multimedia content or separately from the multimedia content with the goal of having the indicia and identifier transmitted to the mobile device 102 prior to the passing of any insertion points defined by the indicia. In one aspect, the rendering module 122 processes the multimedia content while the executable content service 132 processes the indicia of the insertion point and the identifier of the executable content. In one aspect, the rendering module 122 and the executable content service 132 comprise software instructions executed by the processor 202.

Moving to a block 404, the processor 202 determines whether the executable content is available. The executable content is considered available when it can be presented to the user proximate to the insertion point. Perhaps the easiest way to satisfy this requirement if for the executable content to be stored in the executable content storage 134. Another way for the content to be available is for the executable content to be ready for streaming across the first and/or second communication links 108 and 106. Thus, in one aspect, the executable content storage 134 is configured to store executable content customized for a particular user of the mobile device 102. In this aspect, the executable content storage 134 determines whether to store particular executable content, and thereby make the particular executable content available for presentation when identified by the insertion point data. Such a determination may be made based on data about the user of the mobile device 102. In one aspect, the executable content storage 134 may comprise software instructions executed via the processor 204 to store the executable content to and from the memory 204. If at the block 404, the identified executable content is not available, the method 400 proceeds to an end state and the processor 204 may continue providing and/or rending the broadcast stream.

If, at the block 404, the identified executable content is available, the method 400 proceeds to a block 406 and a user control is presented to the user. In perhaps the simplest aspect, the user control cause a prompt to be displayed on the display 210 asking whether the user wishes to view additional content, i.e. the executable content. The user control then monitors the input 212 for a response. It is to be noted that the input 212 may comprise a variety of user interface elements permitting the user to input his or her choice via a variety of methods, including pressing a button, touching a screen, shaking the mobile device 102 with a predetermined motion or through some other user interface component.

Next in block 408, a determination is made as to whether the user has assented to the presentation of the identified executable content. Generally, an assent will only be recognized if the user provides an affirmative response to the prompt. A negative response will be recognize either when the user provides a negative response to the prompt or a time out condition is recognized without receiving any response from the user to the prompt. The time period prior to recognizing a time out condition may be defined by metadata received with the data indicative of the insertion point. If a negative response is identified in step 408, the method proceeds to an end state and the processor 204 may continue providing and/or rending the broadcast stream.

If an affirmative response is identified in step 408, the method proceeds to block 410, wherein the processor 204 presents the executable content to the user. In one aspect, the executable content is presented until the user exits the content. In another aspect, the executable content is presented for a time interval that is determined based on execution of the executable content. In one aspect, the executable content is presented for at least a time specified by one of the executable content or metadata included with the indicia. Upon termination of the presentation of the executable content, the method 400 proceeds to an end state.

In one aspect, at the end of the method 400, the processor 204 may return the mobile device 102 to the presentation of the multimedia content. In one aspect, the processor 204 is configured to continue to receive the multimedia content while the executable content executes and store the received multimedia content for replay from a time proximate the insertion point upon termination of the executable content. In one aspect, the time proximate may be after a specified point in the broadcast content. For example, if the insertion point is during an advertisement and the executable content is related to the advertisement, the processor 204 may be configured to begin storing the received stream after the end of the advertisement.

It is to be recognized that depending on the aspect, certain acts or events of any of the methods described herein can be performed in a different sequence, may be added, merged, or left out all together (e.g., not all described acts or events are necessary for the practice of the method). Moreover, in certain aspects, acts or events may be performed concurrently, e.g., through multi-threaded processing, interrupt processing, or multiple processors, rather than sequentially.

In view of the above, one will appreciate that the disclosure addresses how to enable users to receive desired content. For example, the illustrated aspects may provide a method and apparatus of automatically providing further information on a mobile device via executable content to augment multimedia content items proximate to the broadcast of particular portions of the multimedia content items.

Those skilled in the art will recognize that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

For example, any illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the above detailed description has shown, described, and pointed out novel features of the invention as applied to various aspects, it will be understood that various omissions, substitutions, and changes in the form and details of the device or process illustrated may be made by those skilled in the art without departing from the scope of this disclosure. As will be recognized, the invention may be embodied within a form that does not provide all of the features and benefits set forth herein, as some features may be used or practiced separately from others. The scope of this disclosure is defined by the appended claims, the foregoing description, or both. All changes which come within the meaning and range of equivalency of the claims are to be embraced within their scope.

What is claimed is:

1. A method of providing content, comprising:
   receiving multimedia content, via a bi-directional wireless telecommunication link, on a mobile device;
   presenting the received multimedia content on the mobile device;
   receiving, via the bi-directional wireless telecommunication link, indicia of at least one insertion point in the multimedia content on the mobile device;
   receiving, via the bi-directional wireless telecommunications link, at least one identifier associated with the at least one insertion point on the mobile device, the identifier indicative of one or more executable content;
   providing, on the mobile device, a user control requesting permission to present the executable content, wherein display attributes of parameters for displaying the user control are specified by metadata associated with the received indicia of the at least one insertion point, wherein the parameters include a specified period of time for which the user control will be displayed;
   in response to receiving the permission to present the executable content:
      executing the executable content on the mobile device proximate to the at least one insertion point in;
      determining whether the at least one insertion point occurs during an advertisement related to the executable content; and
      continuing presenting the received multimedia content on the mobile device, wherein continuing presenting comprises presenting multimedia content received during execution of the executable content,
      wherein the multimedia content received during execution begins to be stored after an end point of the advertisement in response to determining that the at least one insertion point occurs during an advertisement related to the executable content.

2. The method of claim 1, wherein presenting multimedia content received during execution of the executable content comprises:
   presenting stored multimedia content upon termination of execution of the executable content.

3. The method of claim 1, wherein:
   receiving multimedia content comprises receiving the multimedia content via a first communication link;
   receiving indicia comprises receiving the indicia on a second communication link; and
   receiving at least one identifier comprises receiving the at least one identifier on the second communication link.

4. The method of claim 3, wherein the second communication link is a cellular communication link.

5. The method of claim 1, further comprising:
receiving and storing executable content prior to reaching an insertion point associated with the executable content during the step of presenting the multimedia content on the mobile device.

6. The method of claim 1, wherein executing the executable content comprises receiving a stream of the executable content from a source external to the mobile device.

7. The method of claim 1, wherein executing the executable content is contingent upon the executable content being stored on the mobile device prior reaching an insertion point associated with the executable content during the step of presenting the multimedia content on the mobile device.

8. The method of claim 1, wherein said executable content is related to subject matter of the multimedia content being presented on the mobile device proximate to the insertion point.

9. The method of claim 1, wherein the executable content comprises an advertisement.

10. The method of claim 1, wherein the at least one identifier provides criteria for selecting a particular executable content from a plurality of executable content.

11. The method of claim 10, wherein the criteria facilitates selection of executable content based on information about a user of the mobile device.

12. The method of claim 1, further comprising:
receiving, via the bi-directional wireless telecommunications link, data identifying a respective demographic group for each of the one or more executable content on the mobile device.

13. The method of claim 1, further comprising:
receiving, via the bi-directional wireless telecommunications link, data identifying one or more selection parameters for selecting one of the one or more executable content on the mobile device, wherein the selection parameters comprise one or more queries for user data of the mobile device.

14. The method of claim 13, further comprising:
receiving, via the bi-directional wireless telecommunications link, data identifying a default executable content that is selected if no executable content among the one or more executable content is selected based on the selection parameters.

15. A mobile device for providing content, comprising:
a receiver;
an output device; and
a processor in communication with the receiver and the output device, the processor configured to perform operations comprising:
receiving multimedia content via the receiver;
presenting the received multimedia content via the output device;
receiving, via a bi-directional wireless telecommunication link, indicia of at least one insertion point in the multimedia content;
receiving, via the bi-directional wireless telecommunication link, at least one identifier associated with the at least one insertion point, the identifier indicative of one or more executable content;
providing, via the output device, a user control requesting permission to present the executable content, wherein parameters for displaying the user control are specified by metadata associated with the received indicia of the at least one insertion point, wherein the parameters include a specified period of time for which the user control will be displayed; and
in response to receiving the permission to present the executable content:
executing the executable content on the output device proximate to the at least one insertion point;
determining whether the at least one insertion point occurs during an advertisement related to the executable content; and
continuing presenting the received multimedia content on the mobile device, wherein continuing presenting comprises presenting multimedia content received during execution of the executable content,
wherein the multimedia content received during execution begins to be stored after an end point of the advertisement in response to determining that the at least one insertion point occurs during an advertisement related to the executable content.

16. The mobile device of claim 15, wherein the processor is configured to perform operations such that presenting multimedia content received during execution of the executable content comprises:
presenting stored multimedia content upon termination of the execution of the executable content.

17. The mobile device of claim 15, wherein the processor is further configured to:
receive the multimedia content via a first communication link;
receive the indicia on a second communication link; and
receive the at least one identifier on the second communication link.

18. The mobile device of claim 17, wherein the second communication link is a cellular communication link.

19. The mobile device of claim 15, further comprising a storage configured to store executable content prior to reaching an insertion point associated with the executable content during presentation of the multimedia content.

20. The mobile device of claim 15, wherein the receiver is configured to receive a stream of the executable content from a source external to the mobile device.

21. The mobile device of claim 15, wherein the processor is configured to execute the executable content contingent upon the executable content being stored on the mobile device prior reaching an insertion point associated with the executable content during presentation of the multimedia content.

22. The mobile device of claim 15, wherein said executable content is related to subject matter of the multimedia content being presented on the mobile device proximate to the insertion point.

23. The mobile device of claim 15, wherein the executable content comprises an advertisement.

24. The mobile device of claim 15, wherein the at least one identifier provides criteria for selecting a particular executable content from a plurality of executable content.

25. The mobile device of claim 24, wherein the criteria facilitates selection of executable content based on information about a user of the mobile device.

26. A non-transitory computer-readable medium having stored thereon codes executable by at least one processor to perform comprising:
receiving multimedia content, via a bi-directional wireless telecommunication link, on a mobile device;
presenting the received multimedia content on the mobile device;

receiving, via the bi-directional wireless telecommunication link, indicia of at least one insertion point in the multimedia content on the mobile device;

receiving, via the bi-directional wireless telecommunication link, at least one identifier associated with the at least one insertion point, the identifier indicative of one or more executable content on the mobile device;

providing, on the mobile device, a user control requesting permission to present the executable content, wherein parameters for displaying the user control are specified by metadata associated with the received indicia of the at least one insertion point, wherein the parameters include a specified period of time for which the user control will be displayed;

in response to receiving the permission to present the executable content:

executing the executable content on the mobile device proximate to the at least one insertion point;

determining whether the at least one insertion point occurs during an advertisement related to the executable content; and continuing presenting the received multimedia content on the mobile device, wherein continuing presenting comprises presenting multimedia content received during execution of the executable content, wherein the multimedia content received during execution begins to be stored after an end point of the advertisement in response to determining that the at least one insertion point occurs during an advertisement related to the executable content.

27. The non-transitory computer-readable medium of claim 26, wherein the stored codes are executable by the at least one processor to perform operations such that presenting multimedia content received during executing of the executable content comprises presenting stored multimedia upon termination of the execution of the executable content.

28. A method of providing content, comprising:

generating indicia of an insertion point instructing a rendering device configured to render multimedia content to insert executable content proximal the insertion point;

generating an identifier indicative of one or more executable content;

providing data indicative of a user interface for prompting a user of the rendering device for permission to display the executable content, wherein parameters for displaying the user interface for prompting the user are specified by metadata associated with the indicia of the insertion point, wherein the parameters include a specified period of time for which the user interface for prompting the user will be displayed;

communicating, via a bi-directional wireless telecommunication link, the indicia, identifier and data in connection with a broadcast of the multimedia content to the rendering device;

in response to receiving the permission to present the executable content:

executing the executable content on the rendering device proximate to the at least one insertion point;

determining, on the rendering device, whether the insertion point occurs during an advertisement related to the executable content; and presenting, on the rendering device, multimedia content that was broadcast during execution of the executable content, wherein the multimedia content that was broadcast during execution begins to be stored after an end point of the advertisement in response to determining that the at least one insertion point occurs during an advertisement related to the executable content.

29. The method of claim 28, wherein communicating the indicia comprises communicating the indicia to the rendering device via a bidirectional communications link.

30. The method of claim 28, wherein generating the indicia further comprises providing data indicative of a user interface for prompting a user of the rendering device as to whether the user desires to see the executable content.

31. The method of claim 28, further comprising communicating the executable content to the rendering device prior to communicating the indicia.

32. A system for providing content, comprising:

a service residing on a server configured to perform operations comprising:

generating indicia of an insertion point instructing the rendering device configured to render multimedia content to insert executable content proximal the insertion point;

generating an identifier indicative of one or more executable content;

providing data indicative of a user interface for prompting a user of the rendering device for permission to display the executable content, wherein parameters for displaying the user interface for prompting the user are specified by metadata associated with the indicia of the insertion point, wherein the parameters include a specified period of time for which the user interface for prompting the user will be displayed; and communicating via a bi-directional wireless telecommunication link, the indicia and data to the rendering device in connection with a broadcast of the multimedia content, wherein, in response to receiving the permission to display the executable content, the rendering device is configured to perform operations comprising:

executing the executable content on the rendering device proximate to the at least one insertion point;

determining whether the insertion point occurs during an advertisement related to the executable content; and presenting the multimedia content that was broadcast during execution of the executable content, wherein the multimedia content that was broadcast during execution begins to be stored after an end point of the advertisement in response to determining that the at least one insertion point occurs during an advertisement related to the executable content.

33. The system of claim 32, wherein the network interface comprises a bidirectional communications link.

34. The system of claim 32, wherein the indicia further comprises data indicative of a user interface for prompting a user of the rendering device as to whether the user desires to see the executable content.

35. The system of claim 32, wherein the service is configured to communicate the executable content to the rendering device prior to communicating the indicia.

36. A system for providing content, comprising:

a rendering device;

means for generating indicia of an insertion point instructing the rendering device configured to render multimedia content to insert executable content proximal the insertion point;

means for generating an identifier indicative of one or more executable content;

means for providing data indicative of a user interface for prompting a user of the rendering device for permission to display the executable content, wherein parameters for displaying the user interface for prompting the user are specified by metadata associated with the indicia of the insertion point, wherein the parameters include a specified period of time for which the user interface for prompting the user will be displayed; and means for communicating, via a bi-directional wireless telecommunication link, the indicia and the data to the rendering device in connection with a broadcast of the multimedia content, wherein the rendering device comprises means for, in response to receiving the permission to display the executable content:

determining whether the insertion point occurs during an advertisement related to the executable content; and presenting multimedia content that was broadcast during execution of the executable content, wherein the multimedia content that was broadcast during execution begins to be stored after an end point of the advertisement in response to determining that the at least one insertion point occurs during an advertisement related to the executable content.

37. The system of claim 36, wherein the indicia further comprises data indicative of a user interface for prompting a user of the rendering device as to whether the user desires to see the executable content.

38. The system of claim 36, wherein means for communicating comprises means for communicating the executable content to the rendering device prior to communicating the indicia.

39. A method of providing content, comprising:
receiving multimedia content on a mobile device;
presenting the received multimedia content on the mobile device;
receiving indicia of at least one insertion point in the multimedia content on the mobile device;
receiving at least one identifier associated with the at least one insertion point on the mobile device, the identifier indicative of one or more executable content;
providing, on the mobile device, a user control requesting permission to present the executable content, wherein parameters for displaying the user control are specified by metadata associated with the received indicia of the at least one insertion point, wherein the parameters include a specified period of time for which the user control will be displayed;
in response to receiving the permission to present the executable content:
executing the executable content on the mobile device proximate to the at least one insertion point;
determining whether the at least one insertion point occurs during an advertisement related to the executable content; and
continuing presenting the received multimedia content on the mobile device, wherein continuing presenting comprises presenting multimedia content received during execution of the executable content,
wherein the multimedia content received during execution begins to be stored after an end point of the advertisement in response to determining that the at least one insertion point occurs during an advertisement related to the executable content.

40. The method of claim 39, further comprising receiving the multimedia content via a broadcast communication link.

41. A mobile device for providing content, comprising:
a receiver;
an output device; and
at least one processor in communication with the receiver and the output device, the at least one processor configured to perform operations comprising:
presenting multimedia content using via the output device;
receiving indicia of at least one insertion point in the multimedia content;
receiving at least one identifier associated with the at least one insertion point, the identifier indicative of one or more executable content;
providing, via the output device, a user control requesting permission to present the executable content, wherein parameters for displaying the user control are specified by metadata associated with the received indicia of the at least one insertion point, wherein the parameters include a specified period of time for which the user control will be displayed;
in response to receiving the permission to present the executable content:
executing the executable content on the output device proximate to the at least one insertion point;
determining whether the at least one insertion point occurs during an advertisement related to the executable content; and
continuing presenting the received multimedia content on the mobile device, wherein continuing presenting comprises presenting multimedia content received during execution of the executable content,
wherein the multimedia content received during execution begins to be stored after an end point of the advertisement in response to determining that the at least one insertion point occurs during an advertisement that is related to the executable content.

42. The mobile device of claim 41, wherein the receiver is configured to receive data via a broadcast communication link.

43. A method of providing content, comprising:
generating indicia of an insertion point instructing a rendering device configured to render multimedia content to insert executable content proximal the insertion point;
generating an identifier indicative of one or more executable content;
providing data indicative of a user interface for prompting a user of the rendering device for permission to display the executable content, wherein parameters for displaying the user interface for prompting the user are specified by metadata associated with the indicia of the insertion point, wherein the parameters include a specified period of time for which the user interface for prompting the user will be displayed;
communicating the indicia, identifier and data in connection with a broadcast of the multimedia content to the rendering device;
in response to receiving the permission to display the executable content:
executing the executable content on the rendering device proximate to the at least one insertion point;
determining, in the rendering device, whether the insertion point occurs during an advertisement related to the executable content; and presenting, on the rendering device, multimedia content that was broadcast, during execution of the executable content, wherein the multimedia content that was broadcast during execution begins to be stored after an end point of the advertisement in response to determining that the at least one insertion point occurs during an advertisement related to the executable content.

44. The method of claim 43, wherein communicating the indicia comprises broadcasting the indicia as part of the broadcast of the multimedia content.

45. A system for providing content, comprising:

a rendering device;

a network interface configured to communicate data with the rendering device; and a service residing on a server configured to perform operations comprising:

generating indicia of an insertion point instructing the rendering device configured to render multimedia content to insert executable content proximal the insertion point;

generating an identifier indicative of one or more executable content;

providing data indicative of a user interface for prompting a user of the rendering device for permission to display the executable content, wherein parameters for displaying the user interface for prompting the user are specified by metadata associated with the indicia of the insertion point, wherein the parameters include a specified period of time for which the user interface for prompting the user will be displayed; and communicating the indicia, identifier and data to the rendering device in connection with a broadcast of the multimedia content, wherein the rendering device is configured, in response to receiving the permission to present the executable content, to perform operations comprising:

executing the executable content on the rendering device proximate to the at least one insertion point;

determining whether the insertion point occurs during an advertisement related to the executable content; and presenting the multimedia content that was broadcast during execution of the executable content, wherein the multimedia content that was broadcast during execution begins to be stored after an end point of the advertisement in response to determining that the at least one insertion point occurs during an advertisement related to the executable content.

46. The system of claim 45, wherein the network interface comprises a broadcast network interface.

* * * * *